(12) United States Patent
Miller et al.

(10) Patent No.: US 8,050,567 B2
(45) Date of Patent: Nov. 1, 2011

(54) SYSTEM AND METHOD FOR TRANSPORTING ASYNCHRONOUS ODUK SIGNALS OVER A SYNCHRONOUS INTERFACE

(75) Inventors: Glen Miller, Haverhill, MA (US); Tracy Xiaoming Ma, Westford, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 616 days.

(21) Appl. No.: 12/210,156

(22) Filed: Sep. 12, 2008

(65) Prior Publication Data

US 2010/0074624 A1  Mar. 25, 2010

(51) Int. Cl.
*H04J 14/08* (2006.01)
(52) U.S. Cl. ........... 398/98; 398/140; 398/154; 398/182
(58) Field of Classification Search ............. 398/98, 398/140, 154
See application file for complete search history.

(56) References Cited

U.S. PATENT DOCUMENTS

| | | | |
|---|---|---|---|
| 7,742,502 B2* | 6/2010 | Vissers et al. | 370/473 |
| 2008/0107418 A1* | 5/2008 | Zhang | 398/98 |
| 2011/0167314 A1* | 7/2011 | Gerstel et al. | 714/752 |

* cited by examiner

*Primary Examiner* — Dung Nguyen
(74) *Attorney, Agent, or Firm* — Law Office of Gerald Maliszewski; Gerald Maliszewski (57) ABSTRACT

System and methods are provided, in an Optical Transport Network (OTN), for communicating asynchronous Tributary Slots (TSs) via a synchronous Optical Payload Transport Unit of level k (OTUk) interface. The transmission method accepts a plurality of TSs at a corresponding plurality of asynchronous data rates. The TSs are mapped, using a tangible memory medium, into pseudo-Optical channel Data Tributary Unit (ODTU) frames synchronized to a common clock. Then, the synchronized pseudo-ODTU frames can be interleaved into an OTUk frame, without the need of a phase-locked loop (PLL) or buffering.

16 Claims, 9 Drawing Sheets

SYSTEM AND METHOD FOR TRANSPORTING ASYNCHRONOUS ODUK SIGNALS OVER A SYNCHRONOUS INTERFACE

BACKGROUND OF THE INVENTION

1. Field of the Invention

This invention generally relates to serial communications and, more particularly, to a system and method for mapping asynchronous tributary streams into a high data rate Optical Transport Network signal without buffering or the use of phase-locked loops (PLLs).

2. Description of the Related Art

Conventional Optical Transport Network (OTN) architecture (standardized in ITU-T G.872, G.709) permits the transport of several lower order/lower bit-rate Optical channel Data Unit of level j (ODUj) over a higher-order/higher bit-rate Optical channel Data Unit of level k, ODUk (k>j). The multiple lower bit-rate ODUj tributaries are Time Division Multiplexed (TDM) into the higher bit-rate ODUk (k>j). Currently defined are ODU1 (about 2.7 Gbit/s), ODU2 (about 10.7 Gbit/s), ODU3 (about 43 Gbit/s), and the ITU is working on the definition of ODU4 (about 112 Gbit/s).

Figure 1:
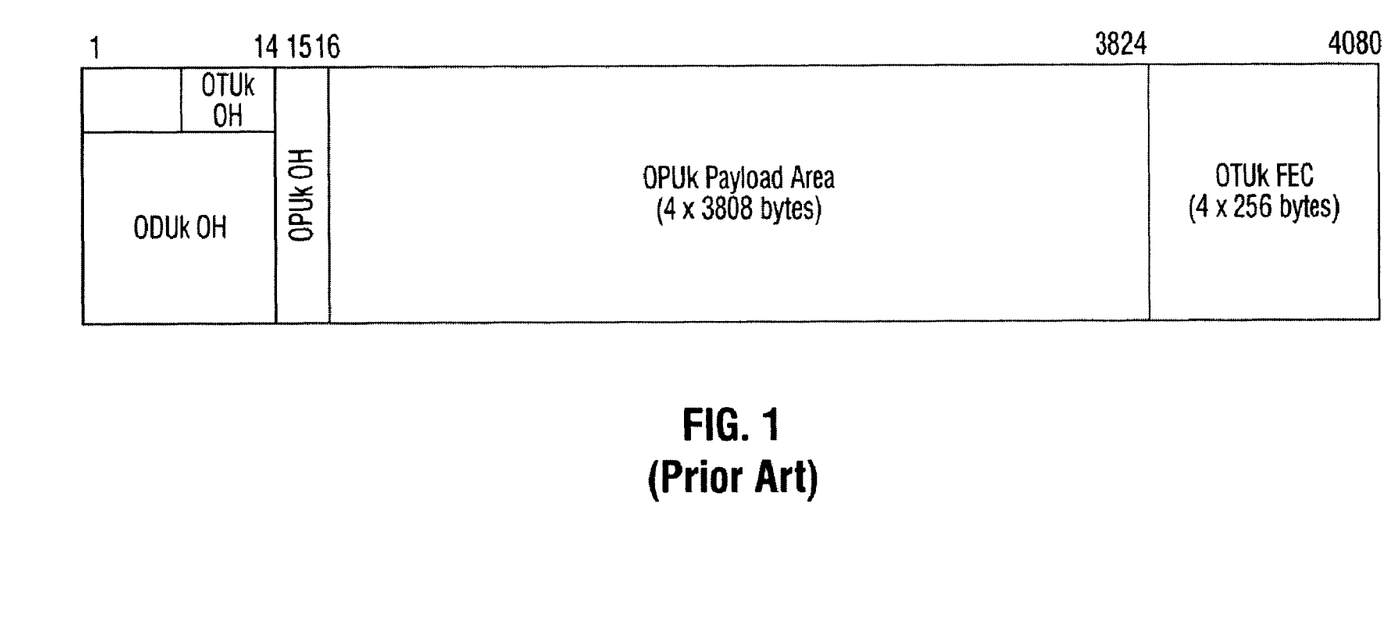
FIG. 1 is a diagram of the OTUk frame structure (prior art).

FIG. 1 is a diagram of the OTUk frame structure (prior art). OTN multiplexing is a layered structure including an Optical Payload Unit of level k (OPUk) defined within Optical Data Unit of level k (ODUk), which is defined within Optical Transport Unit of level k (OTUk). OPUk is the information structure used to adapt client information for transport over an optical channel. It includes client information together with any overhead needed to perform rate adaptation between the client signal rate and the OPUk payload rate, and other OPUk overhead needed to support the client signal transport. OPUk capacities for k=1, k=2, and k=3 are defined. Although not yet defined, k=4 will keep the same frame structure.

The ODUk is an information structure consisting of the information payload (OPUk) and ODUk related overhead. ODUk capacities for k=1, k=2, and k=3 are defined. The optical channel transport units of level k (OTUk and OTUkV) are the information structure used for transport of ODUk over one or more optical channel connections. OTUk is a completely standardized optical transmission unit of level k and the OTUkV is a functionally standardized optical transmission unit of level k. Each consists of the optical data unit and OTUk related overhead, such as forward error correction (FEC) and overhead for management of an optical channel connection. OTUk is characterized by its frame structure, bit rate, and bandwidth. OTUk capacities for k=1, k=2, are k=3 are currently defined.

An OPUk frame includes a number of Tributary Slots (TS), which are interleaved within the OPUk. A Tributary Slot includes a part of the OPUk overhead (OH) area and a part of the OPUk payload area. The Optical channel Data Tributary Unit j into k (ODTUjk) is an information structure that carries a justified ODUj signal. The bytes of the ODTUjk frame are mapped into the OPUk payload area of the Tributary Slot. The bytes of ODTUjk Justification Overhead are mapped into the OPUk OH area.

The ODUj tributary signals may be carried by different network clocks, thus, they are asynchronous to each other. In particular, for ODU2 signals, rates different from the standard rate are adopted in the network due to non-standard implementation. As the transmission networks begin migrating to higher rates at over 40 Gbps (OTU3) and 100 Gbps (OTU4), the transport of lower bit-rate, i.e. ODU2, signals into higher bit-rate OTU3 or OTU4 signals becomes costly if conventional mapping mechanisms are used, as each one of the 4 or 10 ODU2 signals requires an independent PLL to provide clocking for the transport of the tributaries over to a higher bit-rate OTU3 or OTU4 muxing device.

With the asynchronous mapping of ODU2 signals into ODTU23/ODTU24, the justified signals are synchronized into a common clock. The ratio between an OTUk signal rate and the ODTUjk rate requires an m/n scaling of OTUk signals to provide a clock rate that is common to both ODTUjk and all the ODUj tributaries.

It would be advantageous if ODUj tributaries could be mapped into an ODTUjk frame without multiple PLLs. It would be advantageous if each ODUj tributary could be mapped into the ODTUjk frame using a single shared clock.

SUMMARY OF THE INVENTION

A system and method are disclosed that simplify the above-mentioned conventional clocking scheme and minimize the buffering requirements in multiplexing lower bit-rate ODUj tributaries into a higher bit-rate OTUk signal. Also eliminated is a PLL for mapping and multiplexing asynchronous lower bit-rate ODUj signals into a higher bit-rate OTUk signal. The pseudo-ODTUjk frame structure allows simple byte-interleaved multiplexing and minimizes the buffering requirement in the higher bit-rate OTUk signal generation function.

Accordingly, in an Optical Transport Network (OTN), a method is provided for transmitting asynchronous Tributary Slots (TSs) via a synchronous Optical Payload Transport Unit of level k (OTUk) interface. The method accepts a plurality of TSs at a corresponding plurality of asynchronous data rates. The TSs are mapped, using a tangible memory medium, into pseudo-Optical channel Data Tributary Unit (ODTU) frames synchronized to a common clock. Then, the synchronized pseudo-ODTU frames can be interleaved into an OTUk frame, without the need of a phase-locked loop (PLL) or buffering.

If n pseudo-ODTU frames are generated and synchronized to a common clock having a rate of P, then each pseudo-ODTU frame is interleaved into the OTUk frame at a rate of P/n. The TSs are mapped into pseudo-ODTU frames synchronized to a common clock by adding each TS to the payload of a corresponding pseudo-ODTU payload section, and the synchronization of each pseudo-ODTU frame to the common clock is achieved by adding stuff bits in the payload section. A Justification OH (JOH) section is created and added to the pseudo-ODTU. OH section for mapping the stuff bits.

Conversely, a method is also provided for distributing asynchronous TSs received via a synchronous OTUk interface. The method accepts an OTUk frame and deinterleaves the OTUk frame into a plurality of pseudo-ODTU frames synchronized to a common clock. The pseudo-ODTU frames are demapped, using a tangible memory medium, into a plurality of TSs, which are supplied at a corresponding plurality of asynchronous data rates.

Additional details of the above-described methods, as well as systems for recovering and transmitting asynchronous TSs via an OTUk interface are provided below.

DETAILED DESCRIPTION

Figure 2:
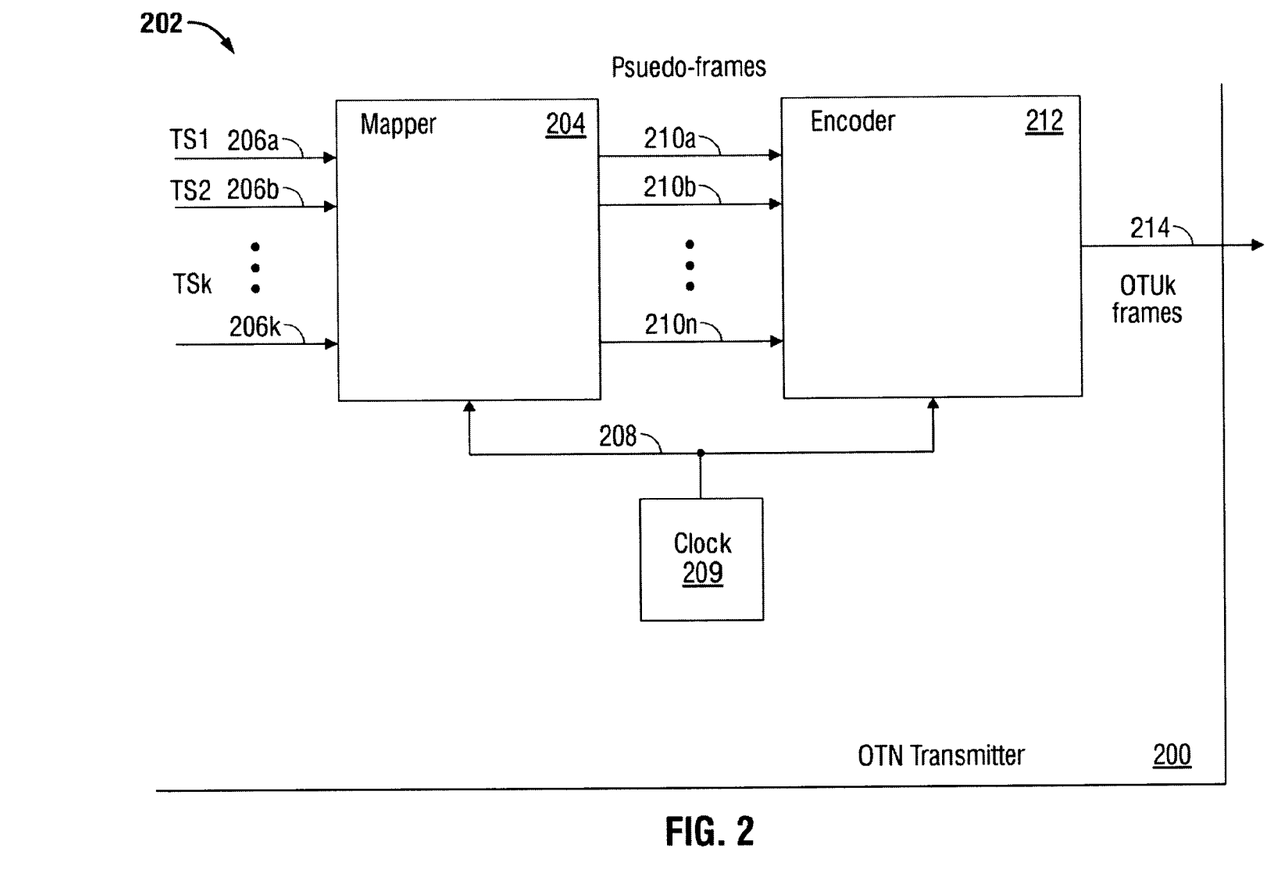
FIG. 2 is a schematic block diagram of an Optical Transport Network (OTN) transmitter, including a system for transporting asynchronous Tributary Slots (TSs) via a synchronous Optical Payload Transport Unit of level k (OTUk) interface.

FIG. 2 is a schematic block diagram of an Optical Transport Network (OTN) transmitter 200, including a system for transporting asynchronous Tributary Slots (TSs) via a synchronous Optical Payload Transport Unit of level k (OTUk) interface. The system 202 comprises a mapper 204 having an input on line 206 to accept a first plurality of TSs at a corresponding first plurality of asynchronous data rates. Inputs 206a, 206b, and 206k are shown, but k is not limited to any particular number. The mapper 204 has an input on line 208 to accept a clock signal from clock 209, and an output on line 210 to supply a first plurality of pseudo-Optical channel Data Tributary Unit (ODTU) frames synchronized to the clock signal on line 208. As shown, lines for three pseudo-ODTU frames are shown (n=3), however, n is not necessarily limited to any particular value. Typically, each TS is mapped into an independent pseudo-ODTU frame, so that k=n. Although not specifically shown, buffers internal to the mapper may be used to buffer all, or a portion of the TSs as the TSs are received, prior to the creation of the pseudo-ODTU frames.

An encoder 212 has an input on lines 210a through 210n to accept the pseudo-ODTU frames, an input on line 208 to accept the clock signal, and an output on line 214 to supply synchronized pseudo-ODTU frames interleaved into an OTUk frame. More explicitly, the mapper 204 receives a clock signal on line 208 having a rate of P and generates n pseudo-ODTU frames synchronized to a common clock having a rate of P. The encoder 212 also receives the clock signal having the rate of P and interleaves each pseudo-ODTU frame at a rate of P/n. Alternately stated, the encoder 212 directly interleaves the pseudo-ODTU frames into the OTUk frame without buffering the pseudo-ODTU frames, or without the need of a separate PLL for each pseudo-ODTU frame.

The mapper 204 generates pseudo-ODTU frames having overhead (OH) and payload sections. The mapper 204 adds each TS to the payload of a corresponding pseudo-ODTU payload section, synchronizes each pseudo-ODTU frame to the common clock by adding stuff bits in the payload section, and creates a Justification OH (JOH) section in the pseudo-ODTU OH section for mapping the stuff bits (see FIG. 4). In some aspects, the pseudo-ODTU OH sections also include Frame Alignment (FA) and BIP parity sections.

Figure 4:
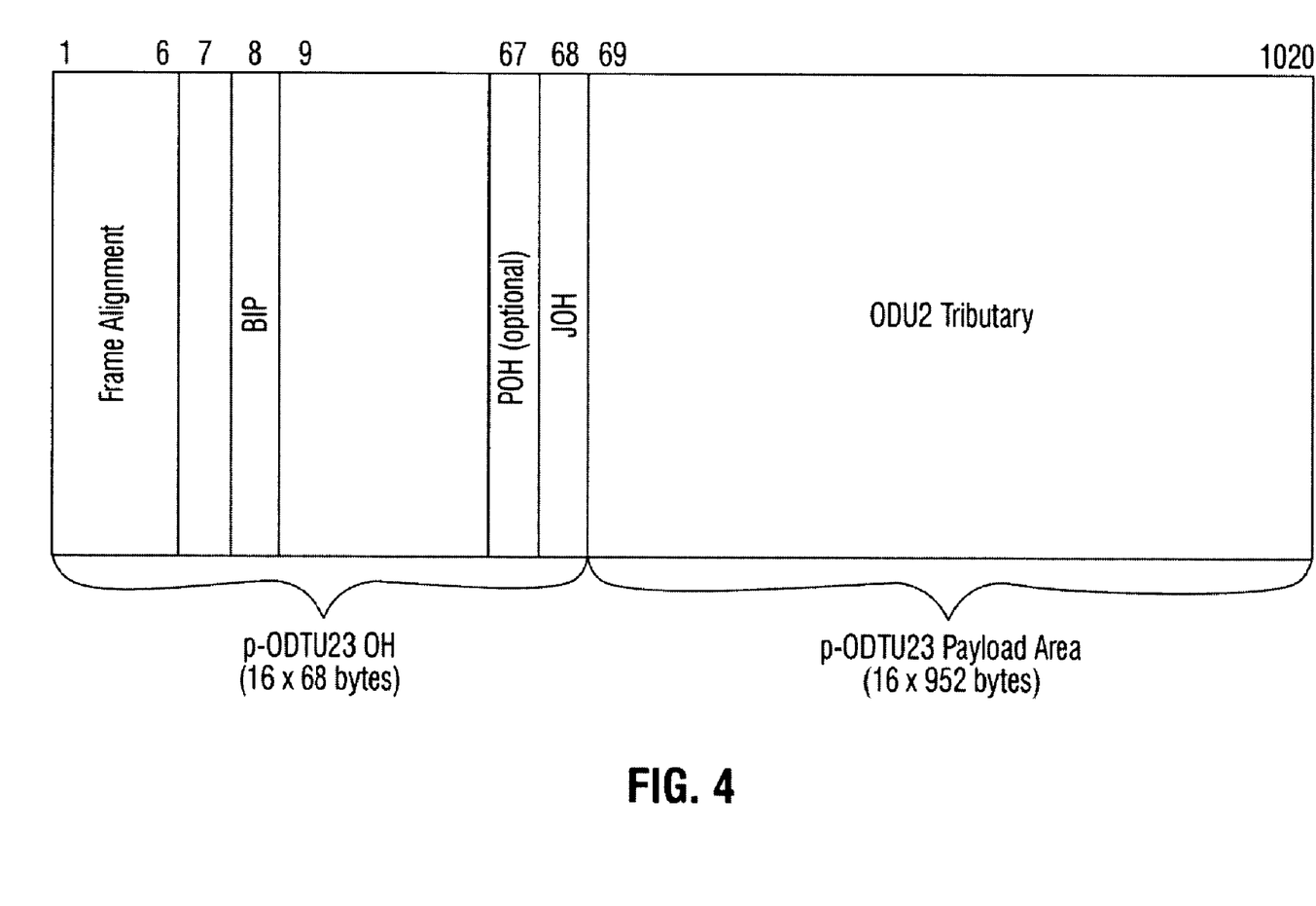
FIG. 4 is a diagram illustrating the p-ODTU23 Frame Structure.

In one aspect, the mapper 204 generates four pseudo-ODTU23 frames with 1020 columns by 16 rows, and the encoder 212 interleaves the four pseudo-ODTU23 frames into an OTU3 frame (see FIG. 4). In another aspect, the mapper 204 either generates 10, 40, or 80 pseudo-ODTU frames, and the encoder 212 interleaves the pseudo-ODTU frames into an OTU4 frame (see FIGS. 5 and 7A).

Figure 3:
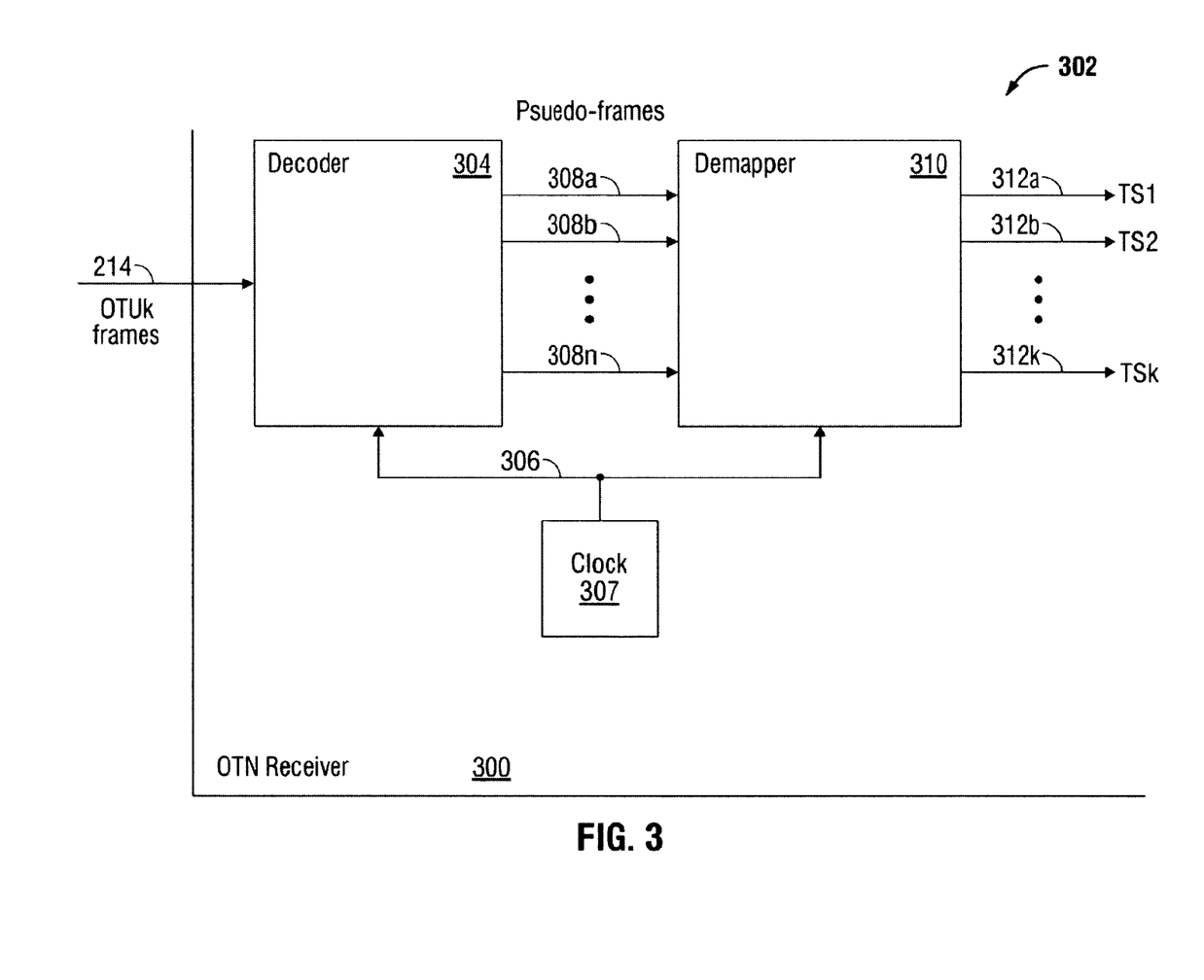
FIG. 3 is a schematic block diagram of an OTN receiver, including a system for recovering asynchronous TSs received via a synchronous OTUk interface.

FIG. 3 is a schematic block diagram of an OTN receiver 300, including a system for recovering asynchronous TSs received via a synchronous OTUk interface. The system 302 comprises a decoder 304 having an input on line 214 to accept an OTUk frame, an input on line 306 to accept a clock signal from clock 307, and an output on lines 308a through 308n to supply a first plurality of pseudo-ODTU frames deinterleaved from the OTUk frame. Each pseudo-ODTU frame is synchronized to the clock signal on line 306.

A demapper 310 has an input on lines 308a-308n to accept the first plurality of pseudo-ODTU frames, an input on line 306 to accept the clock signal, and an output on lines 312a through 312k to supply a first plurality of TSs at a corresponding first plurality of asynchronous data rates. Typically, each TS is demapped from an independent pseudo-ODTU frame, so that k=n. Although not explicitly shown, buffers internal to the demapper may buffer all, or a portion of the TSs subsequent to demapping and prior to their supply on line 312.

The decoder 304 deinterleaves the OTUk frame into n pseudo-ODTU frames, at a rate of P/n per pseudo-ODTU frame, and the demapper 310 demaps n pseudo-ODTU frames into n TSs, where each pseudo-ODTU frames is synchronized to a common clock (line 306) having a rate of P. That is, the decoder 304 directly deinterleaves the OTUk frame into the pseudo-ODTU frames without buffering the pseudo-ODTU frames, and without the use of a separate PLL for each pseudo-ODTU stream.

In one aspect, the demapper 310 demaps the first plurality of pseudo-ODTU frames by accessing a Justification OH (JOH) section in each pseudo-ODTU overhead (OH) section for demapping the stuff bits, removing stuff bits from a payload section of the pseudo-ODTU frame, and supplying the TS from the pseudo-ODTU payload section at the corresponding asynchronous data rate.

Other details of the pseudo-ODTU frame are shared in common with the pseudo-ODTU frame explained in the description of FIG. 2, and are not be repeated here in the interest of brevity. While the invention may potentially be implemented by a processor accessing processor instructions stored in memory, the invention may also be enabled as a state machine logic device in hardware, or as a combination of software instructions and hardware.

Functional Description

The above-described pseudo-ODTUjk frame structure permits simple byte-interleaving of all tributary ODTUjk in OPUk, which minimizes buffering in the ODTUjk to OPUk multiplexing function. Further, the transport of pseudo-ODTUjk requires a fix divide 1/n clock, which eliminates the need of the PLL to generate the m/n scaling of OTUk signal rate.

Pseudo-ODTU23 (D-ODTU23)

OPU3 is divided into 16 tributary slots. Each TS is a structure with 238 columns by 4 rows, which occupies 6.25% of the OPU3 payload area. The 16 OPU3 TSs are byte interleaved in the OPU3 payload area. The Justification Overhead (JOH) of the 16 OPU3 TSs are located in the OPU3 OH area. The JOH for a tributary slot is available once every 16 frames. A 16-frame multi-frame structure is used for this assignment.

For ODTU23 mapping, each ODTU23 maps into four OPU3 TS #a,b,c,d. The ODTU23 JOH is mapped into a JOH byte within the OPU3 OH allocated to OPU3 TS #a,b,c,d.

FIG. 4 is a diagram illustrating the p-ODTU23 Frame Structure. The p-ODTU23 is a structure with 1020 columns by 16 rows. The first 68 columns are the p-ODTU23 OH area. The p-ODTU23 OH consists of Frame Alignment (FA), BIP parity, and POH/Justification OH (JOH) for mapping ODU2 signal into the ODTU23 payload area. Four p-ODTU23 signals are byte-interleaved into OTU3 frames. An OTU3 frame generator overwrites the p-ODTU23 OH with OTU3 OH bytes (OTU3 OH, ODU3 OH and FEC). The JOH of p-ODTU23 are inserted into JOH column of the OPU3 OH at the frame that is assigned to the related tributary slots. The four p-ODTU23 payload data streams are byte-interleaved into the assigned TS of OPU3 payload area.

When each p-ODTU23 runs at a rate that is exactly ¼ of the OTU3 rate, the multiplexing scheme of the 4 p-ODTU23 mentioned above produces the OTU3 signal at exactly the standard OTU3 information rate.

Pseudo-ODTU24 (p-ODTU24)

The definition of OTU4 information rate and structure, including Tributary Slot allocation for OPU4, is not yet finalized in the ITU standard organization. There are two proposals that are likely to be considered for standardization. One proposal divides OPU4 into 40 or 80 Tributary Slots, keeping 8 columns as Fixed Stuff (FS) columns. This allows a column aligned allocation for each ODTU24 Tributaries. The other proposal divides OPU4 into 40 or 80 Tributary Slots without Fixed Stuff columns. The systems described in FIGS. 2 and 3 enable both cases. In the event that the definition of OTU4 information structure is different than these two proposals, a similar p-ODTU24 can be developed based on the basic schemes described herein, and the above-mentioned proposals.

Pseudo-ODTU24 with 8-FS in OPU4 (n-ODTU24-8FS)

Figure 5:
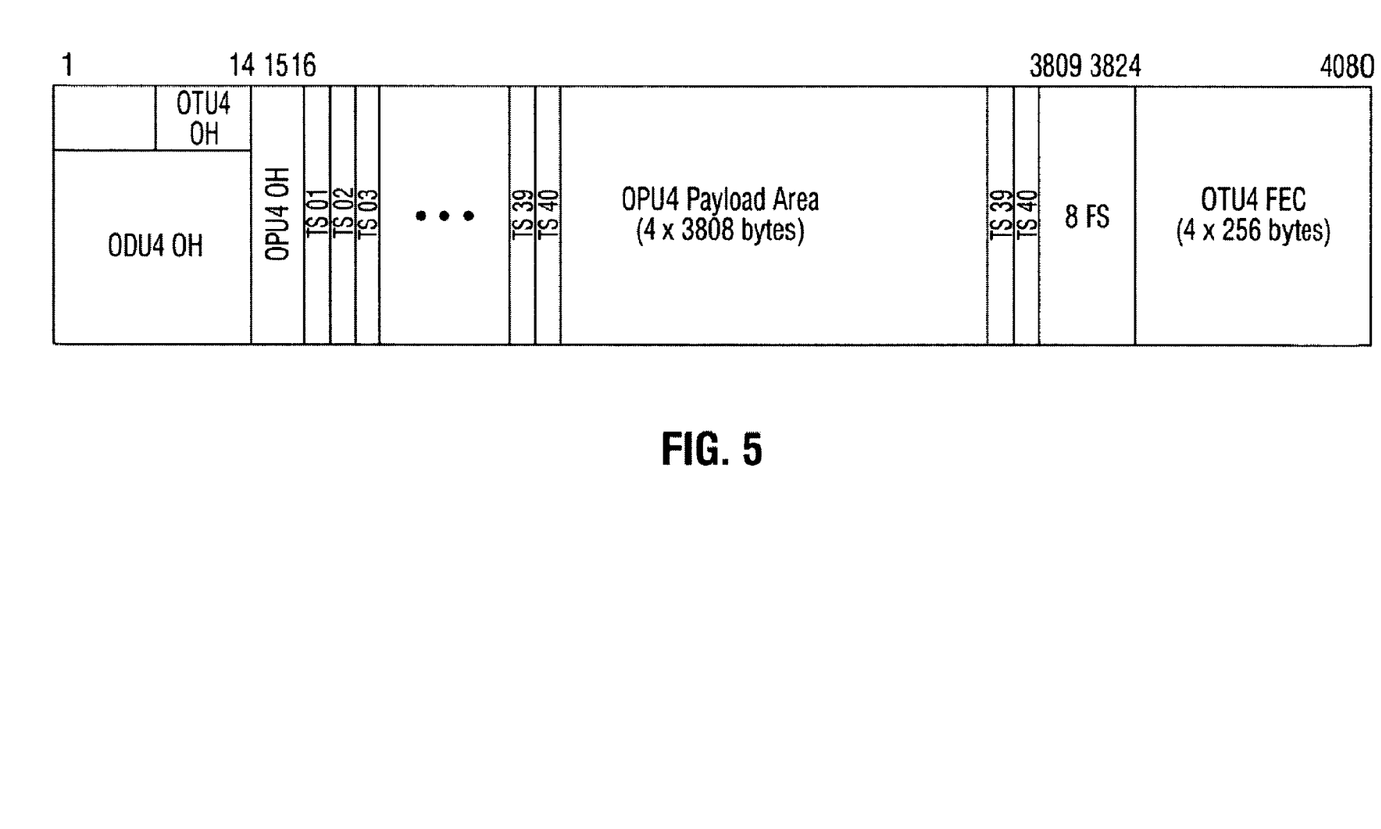
FIG. 5 depicts an OTU4 Frame Structure with 8 Fixed Stuff Columns.

FIG. 5 depicts an OTU4 Frame Structure with 8 Fixed Stuff Columns. In the case of 40 TSs, the 3808 columns of OPU4 payload area are divided into 40 byte-interleaved TSs with 8 columns of Fixed Stuff (FS) bytes as shown. Each tributary slot is a structure with 95 columns by 4 rows, which occupies 2.49% of the OPU4 payload area. The 40 OPU4 TSs are byte interleaved in the OPU4 payload area. The Justification Overhead (JOH) of the 40 OPU4 TSs are located in the OPU4 OH area. JOH for a tributary slot is available once every 40 frames. A 40-frame multi-frame structure is used for this assignment.

For ODTU24 mapping, each ODTU24 maps into four OPU4 TS #a,b,c,d. The ODTU24 JOH is mapped into a JOH byte within the OPU4 OH allocated to OPU4 TS #a,b,c,d.

Figure 6:
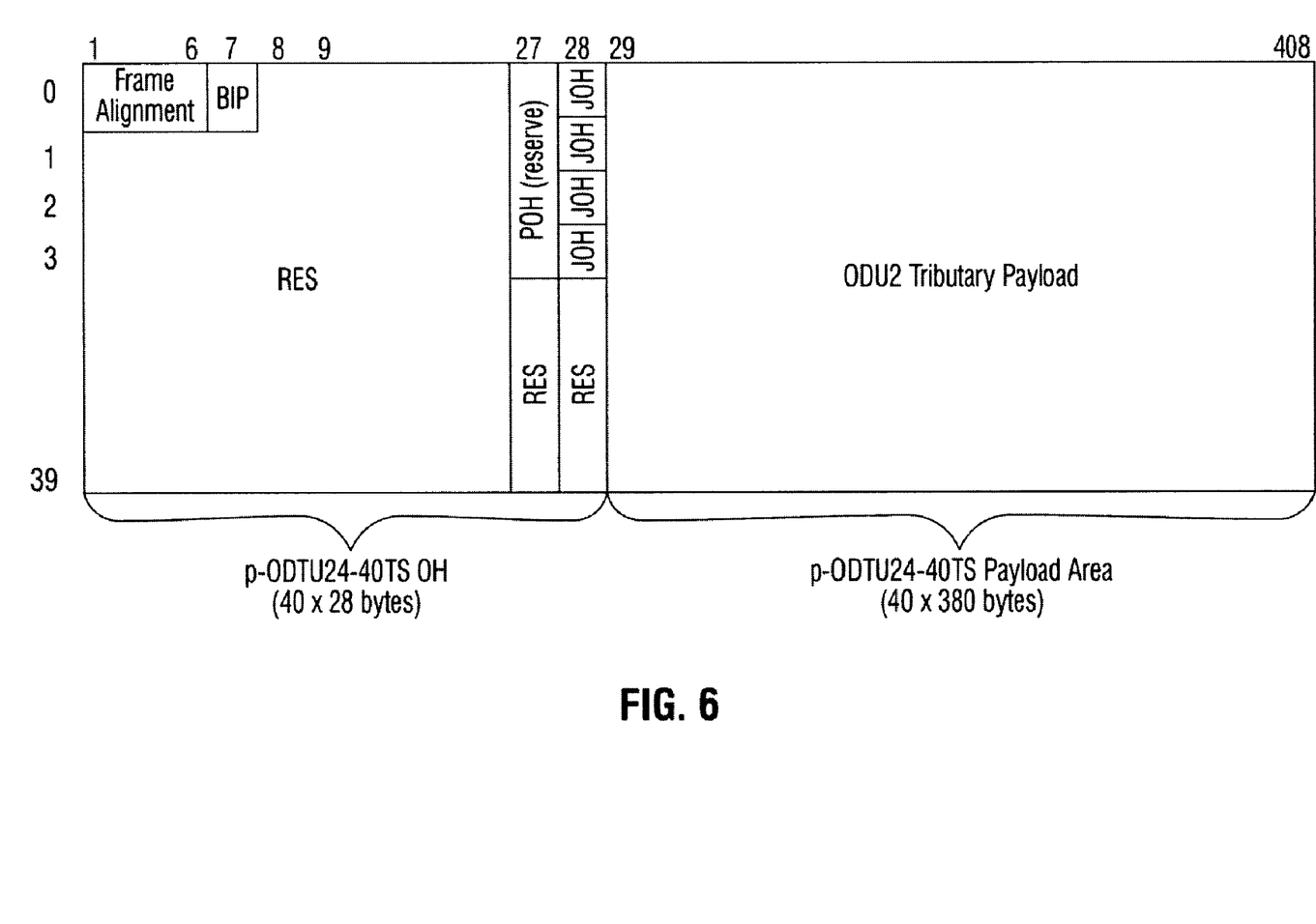
FIG. 6 illustrates the p-ODTU24-8FS Frame Structure.

FIG. 6 illustrates the p-ODTU24-8FS Frame Structure. The p-ODTU24-8FS is a structure with 408 columns by 40 rows. The first 28 columns are the p-ODTU24-8FS OH area. The p-ODTU24-8FS OH includes Frame Alignment (FA), BIP parity, and POH/Justification OH (JOH) for mapping the ODU2 signal into the ODTU24 payload area. Ten p-ODTU24-8FS signals are byte-interleaved into OTU4 frames. An OTU4 frame generator overwrites the p-ODTU24-8FS OH with OTU4 OH bytes (OTU4 OH, ODU4 OH and FEC). The JOH of p-ODTU24-8FS are inserted into JOH column of the OPU4 OH at the frame that is assigned to the related tributary slots. The ten p-ODTU24-8FS payload data streams are byte-interleaved into the assigned TS of OPU4 payload area.

When each p-ODTU24-8FS runs at a rate that is exactly 1/10th of the OTU4 rate, the multiplexing scheme of the 10 p-ODTU24-8FS mentioned above produces the OTU4 signal at exactly the standard OTU4 information rate.

Pseudo-ODTU24 without Fixed Stuff in OPU4 (n-ODTU24-0FS)

Figure 7A:
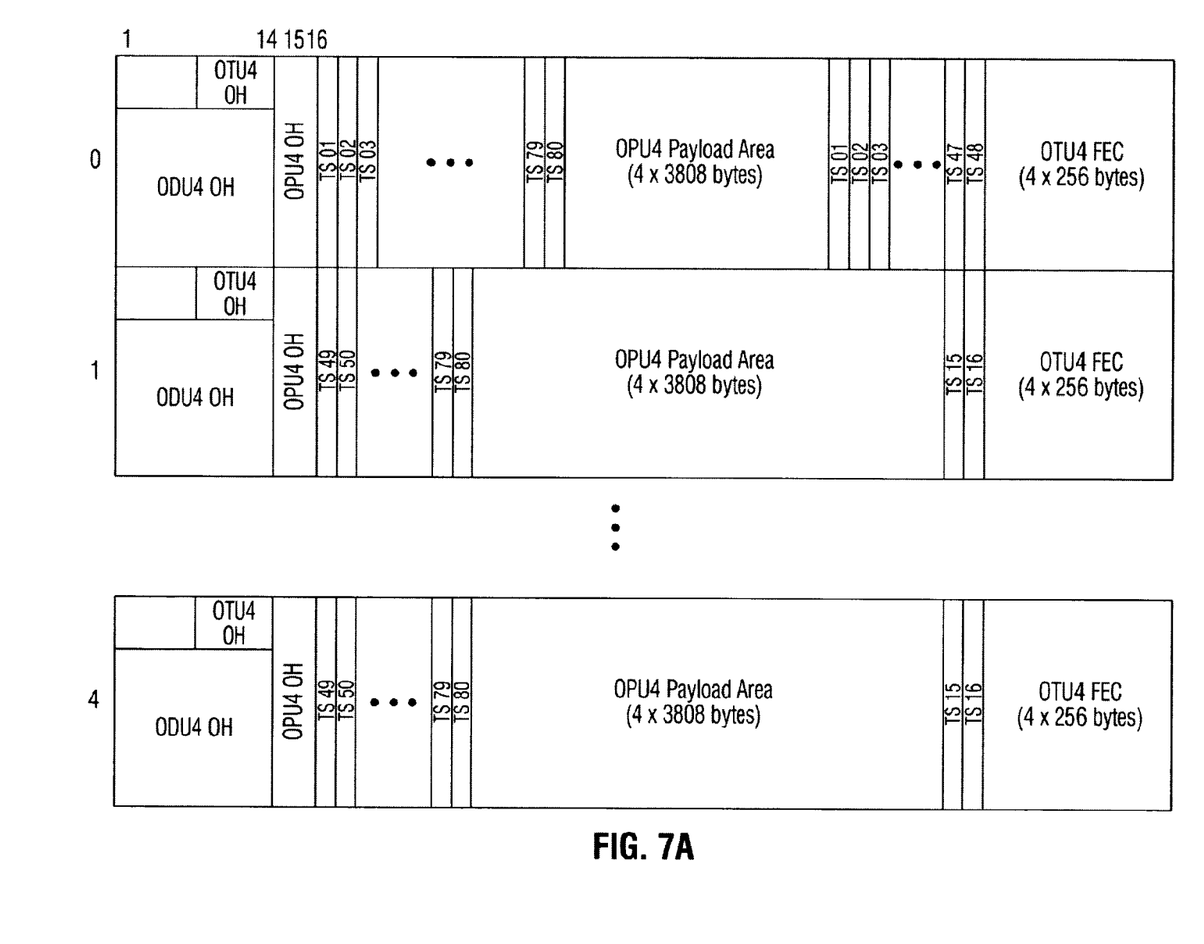
FIG. 7A depicts an OTU4 Frame Structure without 8 Fixed Stuff Columns

FIG. 7A depicts an OTU4 Frame Structure without 8 Fixed Stuff Columns. In the case of 80 TS, the OPU4 payload area is divided into 80 byte-interleaved Tributary Slots without any Fixed Stuff (FS) bytes. Each TS is a structure with 47.6 columns by 4 rows, which occupies 1.25% of the OPU4 payload area. The 80 OPU4 TSs are byte interleaved in the OPU4 payload area. The cycle of 80 TS rotations is completed in 5 OTU4 frames. The Justification Overhead (JOH) of the 80 OPU4 TSs is located in the OPU4 OH area. The JOH for a tributary slot is available once every 80 frames. An 80-frame multi-frame structure is used for this assignment. For ODTU24 mapping, each ODTU24 maps into eight OPU4 TS #a,b,c,d,e,f,g,h. The ODTU24 JOH is mapped into a JOH byte within the OPU4 OH allocated to OPU4 TS #a,b,c,d,e,f,g,h.

Figure 7B:
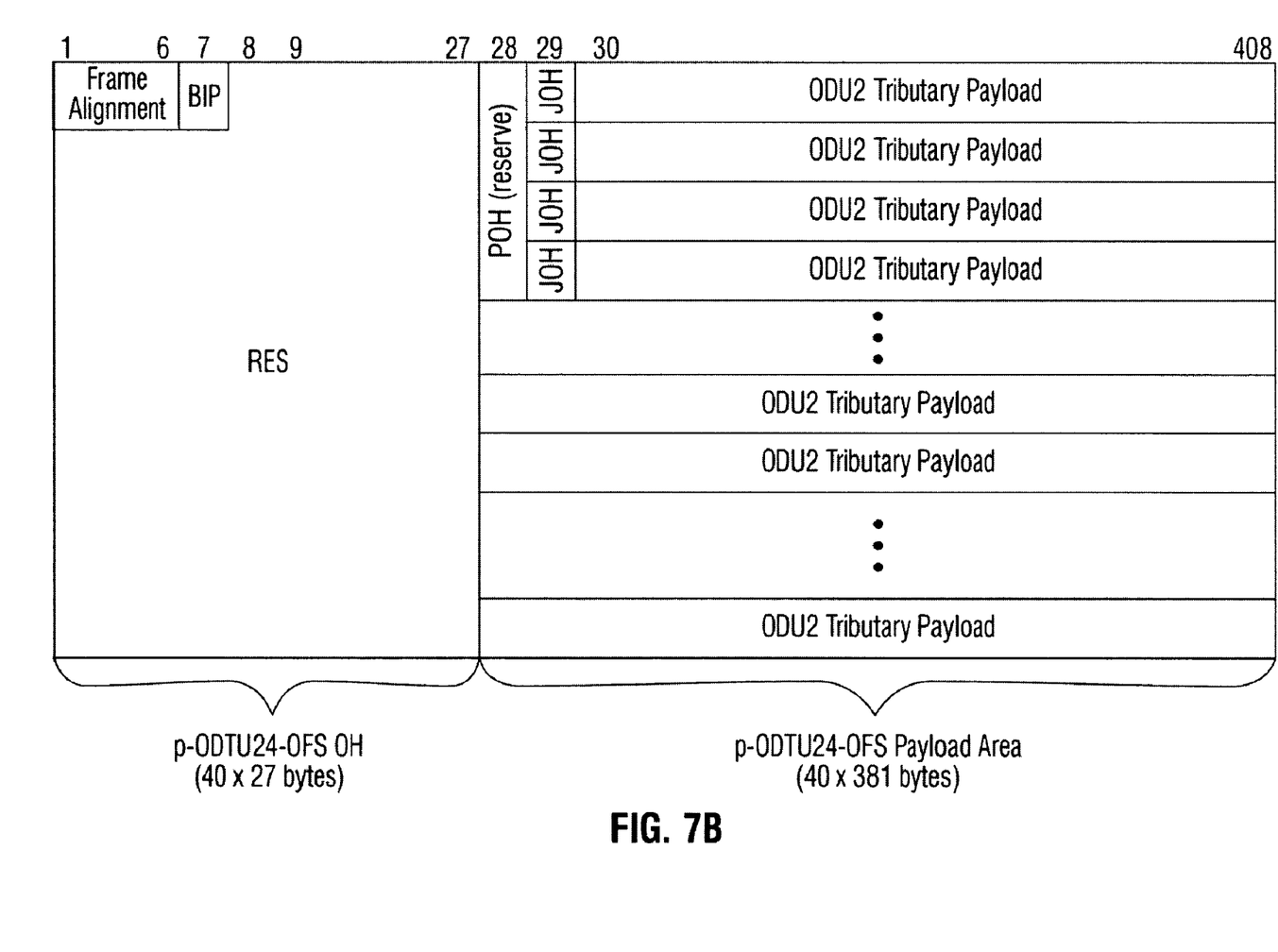
FIG. 7B illustrates the p-ODTU24-OFS Frame Structure.

FIG. 7B illustrates the p-ODTU24-0FS Frame Structure. The p-ODTU24-0FS is a structure with 408 columns by 40 rows. The first 27 columns are the p-ODTU24-0FS OH area. The p-ODTU24-0FS OH includes Frame Alignment (FA) and BIP parity. Column 28 and 29 are shared by the POH/JOH and payload in a 10-rows structure. That is, Col. 28 and Col. 29 in the first row carry two POH/JOH bytes, while Col. 28 and Col. 29 in the next 9 rows carry 18 payload bytes. Ten p-ODTU24-0FS signals are byte-interleaved into OTU4 frames. An OTU4 frame generator overwrites the p-ODTU24-0FS OH with OTU4 OH bytes (OTU4 OH, ODU4 OH and FEC). The JOH of p-ODTU24-0FS is inserted into JOH column of the OPU4 OH at the frame that is assigned to the related tributary slots. The four p-ODTU24-0FS payload data streams are byte-interleaved into the assigned TS of OPU4 payload area.

When each p-ODTU24-0FS runs at a rate that is exactly 1/10th of the OTU4 rate, the multiplexing scheme of the 10 p-ODTU24-0FS mentioned above produces the OTU4 signal at exactly the standard OTU4 information rate.

Figure 8:
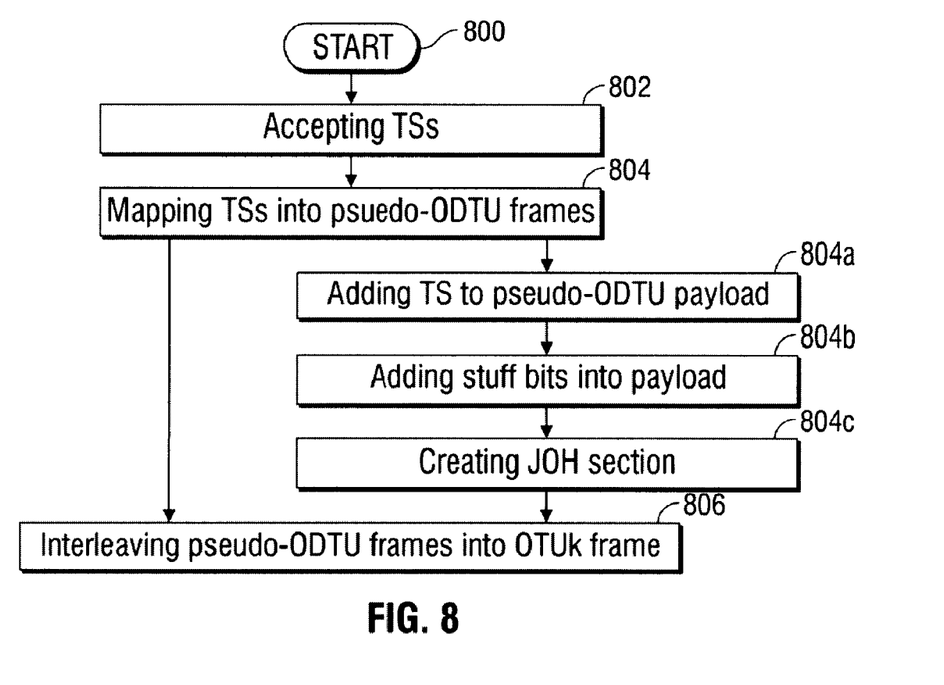
FIG. 8 is a flowchart illustrating a method for transmitting asynchronous TSs via a synchronous OTUk interface, in an OTN.

FIG. 8 is a flowchart illustrating a method for transmitting asynchronous TSs via a synchronous OTUk interface, in an OTN. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 accepts a first plurality of TSs at a corresponding first plurality of asynchronous data rates. Step 804 maps the first plurality of TSs, using a tangible memory medium, into a first plurality of pseudo-ODTU frames synchronized to a common clock. Step 806 interleaves the synchronized pseudo-ODTU frames into an OTUk frame.

In one aspect, mapping the first plurality of TSs into the first plurality of pseudo-ODTU frames in Step 804 includes generating n pseudo-ODTU frames synchronized to a common clock having a rate of P. Then, interleaving the synchronized pseudo-ODTU frames into the OTUk frame in Step 806 includes interleaving each pseudo-ODTU frame at a rate of P/n. That is, the synchronized pseudo-ODTU frames are directly interleaved into the OTUk frame without buffering the pseudo-ODTU frames, and without the use of a PLL.

In another aspect, mapping the first plurality of TSs into the first plurality of pseudo-ODTU frames in Step 804 includes generating pseudo-ODTU frames having overhead (OH) and payload sections. For example, Step 804 may generate pseudo-ODTU OH sections including Frame Alignment (FA) and BIP parity sections. As another example, Step 804 may generate four pseudo-ODTU23 frames with 1020 columns by 16 rows. Then, Step 806 interleaves the four pseudo-ODTU23 frames into an OTU3 frame. As a third example, Step 804 may generate either 40 or 80 pseudo-ODTU frames, and Step 806 interleaves the pseudo-ODTU frames into an OTU4 frame.

In a different aspect, mapping the first plurality of TSs into the first plurality of pseudo-ODTU frames includes substeps. Step 804a adds each TS to the payload of a corresponding pseudo-ODTU payload section. Step 804b synchronizes each pseudo-ODTU frame to the common clock by adding stuff bits in the payload section. Step 804c creates a Justification OH (JOH) section in the pseudo-ODTU OH section for mapping the stuff bits.

Figure 9:
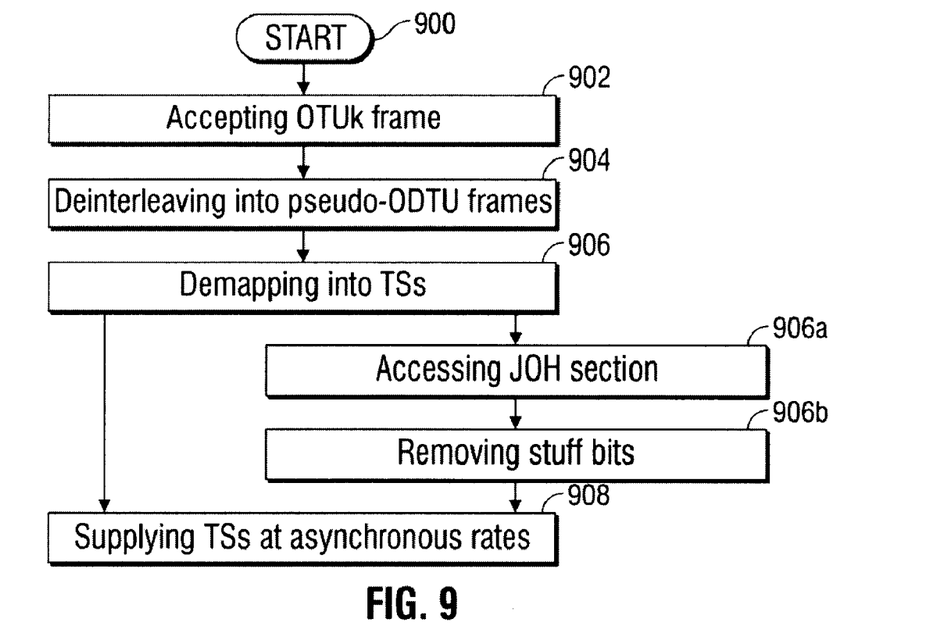
FIG. 9 is a flowchart illustrating a method for distributing asynchronous TSs received via a synchronous OTUk interface, in an OTN.

FIG. 9 is a flowchart illustrating a method for distributing asynchronous TSs received via a synchronous OTUk interface, in an OTN. The method starts at Step 900. Step 902 accepts an OTUk frame. Step 904 deinterleaves the OTUk frame into a first plurality of pseudo-ODTU frames synchronized to a common clock. Step 906 demaps the first plurality of pseudo-ODTU frames, using a tangible memory medium, into a first plurality of TSs. Step 908 supplies the first plurality of buffered TSs at a corresponding first plurality of asynchronous data rates.

In one aspect, deinterleaving the synchronized pseudo-ODTU frames in Step 904 includes deinterleaving the OTUk frame into n pseudo-ODTU frames at a rate of P/n per pseudo-ODTU frame. Then, Step 906 demaps n pseudo-ODTU frames into n TSs, where each pseudo-ODTU frame is synchronized to a common clock having the P clock rate. That is, Step 904 directly deinterleaves the OTUk frame into the pseudo-ODTU frames without buffering the pseudo-ODTU frames, and without the use of a PLL.

In another aspect, demapping the first plurality of pseudo-ODTU frames in Step 906 includes substeps. Step 906a accesses a Justification OH (JOH) section in each pseudo-ODTU overhead (OH) section for demapping stuff bits. Step 906b removes stuff bits from a payload section of the pseudo-ODTU frame. Then, Step 908 supplies the TSs at a data rate responsive to removing the stuff bits.

Systems and methods have been presenting for recovering and transmitting asynchronous TSs via a synchronous ODUk interface. Particular frame structures and process steps have been given to illustrate the invention. However, the invention is not limited to merely these examples. Other variations and embodiments of the invention will occur to those skilled in the art.

We claim:

1. In an Optical Transport Network (OTN), a method for transmitting asynchronous Tributary Slots (TSs) via a synchronous Optical Payload Transport Unit of level k (OTUk) interface, the method comprising:
    accepting a first plurality of TSs at a corresponding first plurality of asynchronous data rates;
    mapping the first plurality of TSs, using a tangible memory medium, into a first plurality of pseudo-Optical channel Data Tributary Unit (ODTU) frames synchronized to a common clock; and,
    interleaving the synchronized pseudo-ODTU frames into an OTUk frame.

2. The method of claim 1 wherein mapping the first plurality of TSs into the first plurality of pseudo-ODTU frames includes generating pseudo-ODTU frames having overhead (OH) and payload sections.

3. The method of claim 2 wherein mapping the first plurality of TSs into the first plurality of pseudo-ODTU frames synchronized to a common clock includes:
    adding each TS to the payload of a corresponding pseudo-ODTU payload section;
    synchronizing each pseudo-ODTU frame to the common clock by adding stuff bits in the payload section; and,
    creating a Justification OH (JOH) section in the pseudo-ODTU OH section for mapping the stuff bits.

4. The method of claim 2 wherein mapping the first plurality of TSs into pseudo-ODTU frames having an OH section includes generating pseudo-ODTU OH sections including Frame Alignment (FA) and BIP parity sections.

5. The method of claim 1 wherein mapping the first plurality of TSs into the first plurality of pseudo-ODTU frames synchronized to the common clock includes generating n pseudo-ODTU frames synchronized to a common clock having a rate of P; and,
    wherein interleaving the synchronized pseudo-ODTU frames into the OTUk frame includes interleaving each pseudo-ODTU frame at a rate of P/n.

6. The method of claim 1 wherein interleaving the synchronized pseudo-ODTU frames into the OTUk frame includes directly interleaving the synchronized pseudo-ODTU frames into the OTUk frame without buffering the pseudo-ODTU frames.

7. The method of claim 1 wherein mapping the first plurality of TSs into the first plurality of pseudo-ODTU frames synchronized to a common clock includes generating four pseudo-ODTU23 frames with 1020 columns by 16 rows; and,
    wherein interleaving the synchronized pseudo-ODTU frames into the OTUk frame includes interleaving the four pseudo-ODTU23 frames into an OTU3 frame.

8. The method of claim 1 wherein mapping the first plurality of TSs into the first plurality of pseudo-ODTU frames synchronized to a common clock includes generating a number of pseudo-ODTU frames selected from a group consisting of 40 and 80; and,
    wherein interleaving the synchronized pseudo-ODTU frames into the OTUk frame includes interleaving the pseudo-ODTU frames into an OTU4 frame.

9. In an Optical Transport Network (OTN) transmitter, a system for transporting asynchronous Tributary Slots (TSs) via a synchronous Optical Payload Transport Unit of level k (OTUk) interface, the system comprising:
    a mapper having an input to accept a first plurality of TSs at a corresponding first plurality of asynchronous data rates, an input to accept a clock signal, and an output to supply a first plurality of pseudo-Optical channel Data Tributary Unit (ODTU) frames synchronized to the clock signal;
    an encoder having an input to accept the pseudo-ODTU frames, an input to accept the clock signal, and an output to supply synchronized pseudo-ODTU frames interleaved into an OTUk frame.

10. The system of claim 9 wherein the mapper generates pseudo-ODTU frames having overhead (OH) and payload sections.

11. The system of claim 10 wherein the mapper adds each TS to the payload of a corresponding pseudo-ODTU payload section, synchronizes each pseudo-ODTU frame to the common clock by adding stuff bits in the payload section, and creates a Justification OH (JOH) section in the pseudo-ODTU OH section for mapping the stuff bits.

12. The system of claim 10 wherein the mapper generates pseudo-ODTU OH sections including Frame Alignment (FA) and BIP parity sections.

13. The system of claim 9 wherein the mapper receives a clock signal having a rate of P and generates n pseudo-ODTU frames synchronized to a common clock having a rate of P; and, wherein the encoder receives the clock signal having the rate of P and interleaves each pseudo-ODTU frame at a rate of P/n, 14. The system of claim 9 wherein the encoder directly interleaves the pseudo-ODTU frames into the OTUk frame without buffering the pseudo-ODTU frames.

15. The system of claim 9 wherein the mapper generates four pseudo-ODTU23 frames with 1020 columns by 16 rows; and, wherein the encoder interleaves the four pseudo-ODTU23 frames into an OTU3 frame.

16. The system of claim 9 wherein the mapper generates a number of pseudo-ODTU frames selected from a group consisting of 40 and 80; and, wherein the encoder interleaves the pseudo-ODTU frames into an OTU4 frame.

* * * * *